E. B. JESSE.
PIE PLATE HOLDER.
APPLICATION FILED JUNE 30, 1916.

1,351,387.

Patented Aug. 31, 1920.

Witnesses
Philip Terrell
Frances G. Boswell

Inventor
E. B. Jesse
By
D. Swift & Co.
Attorneys

UNITED STATES PATENT OFFICE.

EOLINE BALL JESSE, OF NUTTSVILLE, VIRGINIA.

PIE-PLATE HOLDER.

1,351,387.          Specification of Letters Patent.     Patented Aug. 31, 1920.

Application filed June 30, 1916. Serial No. 106,841.

*To all whom it may concern:*

Be it known that I, EOLINE BALL JESSE, a citizen of the United States, residing at Nuttsville, in the county of Lancaster, State of Virginia, have invented a new and useful Pie-Plate Holder; and I do hereby declare the following to be a full, clear, and exact description of the invention, such as will enable others skilled in the art to which it appertains to make and use the same.

This invention relates to a new and useful pie-plate holder, and the object of the invention is to provide a holder, consisting of an enlarged rectangular sheet metal plate having openings for the reception of pie plates, and provided with a downwardly extending flange, deep enough to hold the bottoms of said pie plates spaced from the oven grate or the bottom of the oven, so that the heat will thoroughly circulate under the holder and said pie plates.

Another object of the invention is to provide improved means for connecting the handles to the holder, in fact to the flange, to prevent the handles from becoming too easily detached.

Another object of the invention is to provide improved means consisting of a depression in the holder adjacent each pie plate opening, to facilitate the removal of the pie plate.

In practical fields the details of construction may necessitate alterations, falling within the scope of what is claimed.

The invention comprises further features and combination of parts, as hereinafter set forth, shown in the drawings and claimed.

In the drawings:—

Figure 1:
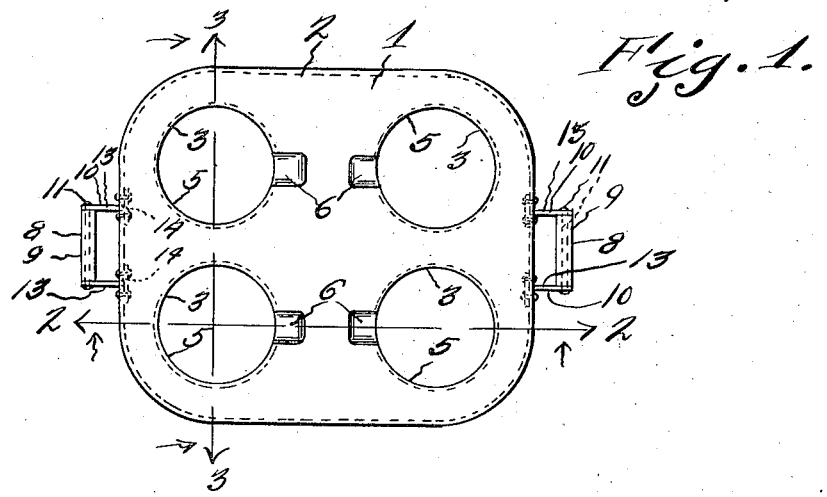
Figure 1 is a plan view of the improved holder constructed in accordance with the invention.
Figure 2:
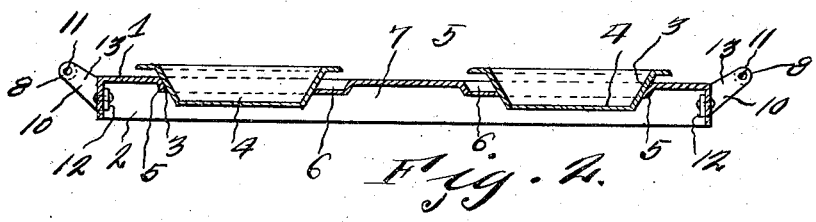
Fig. 2 is a sectional view of line 2—2 of Fig. 1.
Figure 3:
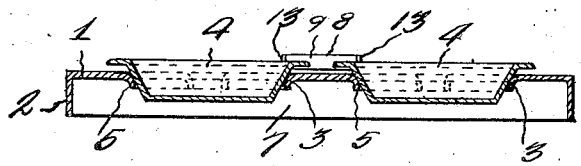
Fig. 3 is a sectional view of line 3—3 of Fig. 1.

Referring more especially to the drawings, 1 designates a holder, which comprises an enlarged sheet metal plate having rounded corners, and provided with a flange 2, which extends about the four edges of said plate and projects downwardly, and extends around said corners. The plate is provided with a plurality of openings 3, which are to be of such diameters as to permit of the reception of the conventional form of pie plates 4. The edge of each opening has a downwardly extending annular flange 5, which supports the pie plate, as shown in Fig. 2 clearly. Adjacent each opening, the plate of the holder is provided with a depression 6, for the reception of the hand, to facilitate the removal of the pie plate, that is, when the holder has been removed from the oven. It is to be noted that the flange 2 extends downwardly far enough, to support the bottoms of the pie plates away from the bottom of the oven or grate, thereby affording a hot air or heat chamber 7, which constitutes means to permit the heat to thoroughly radiate under the bottoms of said pie plates, to expedite the baking of the pies. The holder is provided with oppositely arranged handles 8, each of which consists of the sleeve 9 and the angle plates 10, between the outer ends of which, the sleeve 9 is secured by the rod 11 whose ends are riveted, as shown. The inner portions of said angular members 10 are T-shaped, and these T-shaped portions are secured on the inner face of the flange 2, while the portions 13 of said plates 10 pass through vertical slots 14 of the flange 2. These T-shaped portions 12 may be secured to the flange 2 by soldering or the like, or riveted. By this particular construction, the handles are more durable, and at the same time said T-shaped portions 12 act to strengthen or reinforce the flange 2.

The invention having been set forth, what is claimed as new and useful is:—

A pie plate holder formed from a single sheet of material, said holder comprising an enlarged body portion having its edges provided with depending marginal flanges, said body plate having a plurality of pie plate receiving openings, the marginal edges of each pie plate receiving opening having a depending annular inwardly inclined flange, said inclined flange being inclined at substantially the same inclination as the body of the pie plate, said body plate having depressions adjacent the sides of the pie plate opening and disposed at the inner edges of the openings, the pie plate opening flanges terminating at each side of the depression, the depth of the depressions being the same as the depth of the flanges of the pie plate openings, thereby forming an engaging edge adapted to engage the side of the pie plate, said depressions forming means whereby the hand may be placed in a position to grasp the pie plates and remove them from the body plate openings.

In testimony whereof I have signed my name to this specification in the presence of two subscribing witnesses.

EOLINE BALL JESSE.

Witnesses:
L. GENEVIEVE BALL,
JAMES D. JESSE.